(12) United States Patent
Gindraux et al.

(10) Patent No.: US 10,436,914 B2
(45) Date of Patent: Oct. 8, 2019

(54) DOSIMETER DEVICE

(71) Applicant: Dosilab AG, Koniz (CH)

(72) Inventors: Loys Gindraux, Meilen (CH); Miha Furlan, Bern (CH); Frederic Godart, Chatonrupt (FR)

(73) Assignee: DOSILAB AG, Koniz (CH)

( * ) Notice: Subject to any disclaimer, the term of this patent is extended or adjusted under 35 U.S.C. 154(b) by 0 days.

(21) Appl. No.: 15/385,938

(22) Filed: Dec. 21, 2016

(65) Prior Publication Data

US 2017/0176603 A1 Jun. 22, 2017

(30) Foreign Application Priority Data

Dec. 22, 2015 (CH) ........................................ 1899/15

(51) Int. Cl.
*G01T 1/10* (2006.01)
*G01T 7/00* (2006.01)
*G01T 1/02* (2006.01)

(52) U.S. Cl.
CPC .................. *G01T 1/10* (2013.01); *G01T 1/02* (2013.01); *G01T 7/00* (2013.01)

(58) Field of Classification Search
CPC ..................................... G01T 1/10; G01T 7/00
See application file for complete search history.

(56) References Cited

U.S. PATENT DOCUMENTS

| | | | |
|---|---|---|---|
| 3,597,054 A * | 8/1971 | Winter | A61F 9/022 250/474.1 |
| 4,372,680 A * | 2/1983 | Adams | G01J 1/42 250/338.1 |
| 4,535,244 A * | 8/1985 | Burnham | G01J 1/02 250/372 |
| 4,546,251 A * | 10/1985 | Schaffer | G01D 5/48 250/252.1 |
| 4,550,984 A * | 11/1985 | Reymond | F41G 3/225 116/202 |
| 4,638,163 A | 1/1987 | Braunlich et al. | |
| 4,825,084 A * | 4/1989 | Braunlich | G01T 1/11 250/337 |
| 4,839,518 A | 6/1989 | Braunlich et al. | |

(Continued)

FOREIGN PATENT DOCUMENTS

DE 962 005C C 4/1957
EP 1 112 526 B1 7/2001

(Continued)

OTHER PUBLICATIONS

CH Search Report, dated Apr. 22, 2016, from corresponding CH application.

(Continued)

*Primary Examiner* — David P Porta
*Assistant Examiner* — Djura Malevic
(74) *Attorney, Agent, or Firm* — Young & Thompson (57) ABSTRACT

The dosimeter device includes a carrier part (10), which includes a closed casing (11) formed of fixedly interconnected walls which enclose a measuring element (8) for detecting ionizing radiation, and fastening aids (12, 20) for the detachable fastening of the carrier part on a carrying device (1) which can be carried on a body part of a user, wherein the fastening aids are configured for defining the location of the fastening of the carrier part on the carrying device.

18 Claims, 10 Drawing Sheets

(56) References Cited

U.S. PATENT DOCUMENTS

| | | | |
|---|---|---|---|
| 4,906,848 A | 3/1990 | Braunlich et al. | |
| 4,999,504 A * | 3/1991 | Braunlich | G01T 1/105 |
| | | | 250/337 |
| 5,015,855 A * | 5/1991 | Braunlich | G01T 1/105 |
| | | | 250/337 |
| 5,041,734 A | 8/1991 | Braunlich et al. | |
| 5,045,700 A * | 9/1991 | Crowson | G01T 1/185 |
| | | | 250/336.1 |
| 5,049,754 A | 9/1991 | Hoelscher et al. | |
| 5,081,363 A | 1/1992 | Tetzlaff et al. | |
| 5,083,031 A | 1/1992 | Hoelsher et al. | |
| 5,124,993 A | 6/1992 | Braunlich et al. | |
| 5,151,600 A * | 9/1992 | Black | G02C 11/00 |
| | | | 250/372 |
| 5,172,256 A * | 12/1992 | Sethofer | A61F 9/023 |
| | | | 349/116 |
| 5,992,996 A * | 11/1999 | Sawyer | A61F 9/02 |
| | | | 351/158 |
| 6,132,681 A * | 10/2000 | Faran | G01J 1/50 |
| | | | 250/482.1 |
| 6,897,448 B2 * | 5/2005 | Smith | G01T 1/20 |
| | | | 250/367 |
| 7,500,746 B1 * | 3/2009 | Howell | G02C 11/00 |
| | | | 351/158 |
| 7,718,804 B2 * | 5/2010 | Geddes | A61K 49/0021 |
| | | | 546/13 |
| 7,922,321 B2 * | 4/2011 | Howell | G02C 5/001 |
| | | | 351/158 |
| 8,148,701 B2 | 4/2012 | Yoder | |
| 8,172,459 B2 * | 5/2012 | Abreu | A61B 5/0002 |
| | | | 374/208 |
| 8,178,853 B2 | 5/2012 | Yoder | |
| 8,235,301 B2 | 8/2012 | Yoder | |
| 8,373,142 B2 | 2/2013 | Yoder et al. | |
| 8,434,863 B2 * | 5/2013 | Howell | G02C 11/10 |
| | | | 351/121 |
| 8,476,604 B2 | 7/2013 | Yoder et al. | |
| 8,530,862 B2 | 9/2013 | Yoder et al. | |
| 8,541,749 B2 | 9/2013 | Yoder et al. | |
| 8,541,761 B2 | 9/2013 | Yoder et al. | |
| 8,552,403 B2 | 10/2013 | Yoder et al. | |
| 8,563,948 B2 | 10/2013 | Yoder et al. | |
| 8,575,572 B2 | 11/2013 | Yoder et al. | |
| 8,592,782 B2 | 11/2013 | Yoder et al. | |
| 8,633,455 B2 | 1/2014 | Yoder et al. | |
| 8,648,317 B2 | 2/2014 | Yoder et al. | |
| 8,686,871 B2 * | 4/2014 | Jensen | G07C 3/08 |
| | | | 340/691.1 |
| 8,785,887 B1 | 7/2014 | Yoder et al. | |
| 8,849,379 B2 * | 9/2014 | Abreu | A61B 5/0008 |
| | | | 600/474 |
| 8,897,100 B2 * | 11/2014 | Joo | G04F 3/06 |
| | | | 368/109 |
| 8,921,810 B2 | 12/2014 | Yoder et al. | |
| 9,179,274 B2 | 11/2015 | Lisbey et al. | |
| 9,329,278 B2 | 5/2016 | Yoder | |
| 2001/0034500 A1 * | 10/2001 | March | A61B 5/14532 |
| | | | 604/66 |
| 2005/0168751 A1 * | 8/2005 | Horii | A61B 5/0062 |
| | | | 356/479 |
| 2007/0085496 A1 * | 4/2007 | Philipp | A61B 17/151 |
| | | | 318/139 |
| 2011/0116076 A1 * | 5/2011 | Chantry | A61F 9/06 |
| | | | 356/51 |
| 2012/0118980 A1 * | 5/2012 | Yoder | G01T 1/105 |
| | | | 235/492 |
| 2013/0320239 A1 | 12/2013 | Yoder et al. | |
| 2014/0011286 A1 * | 1/2014 | Potyrailo | G01N 33/0031 |
| | | | 436/149 |
| 2014/0041105 A1 * | 2/2014 | Zemlak | A61F 9/029 |
| | | | 2/426 |
| 2014/0176182 A1 * | 6/2014 | Kuhn | G11C 16/22 |
| | | | 326/8 |
| 2014/0217309 A1 | 8/2014 | Yoder et al. | |
| 2014/0256865 A1 * | 9/2014 | Boulton | A42B 3/225 |
| | | | 524/406 |

FOREIGN PATENT DOCUMENTS

| | | |
|---|---|---|
| FR | 2 614 107 A1 | 10/1998 |
| JP | 2000 275346 A | 10/2000 |

OTHER PUBLICATIONS

European Search Report issued in EP 16 20 4963, dated Apr. 13, 2017.

* cited by examiner

DOSIMETER DEVICE

FIELD OF THE INVENTION

The present invention relates to a dosimeter device comprising a carrier part and fastening aids for fastening the carrier part to a carrying device which can be carried on a body part of a user.

BACKGROUND OF THE INVENTION

Ionizing radiation of the type utilized in many workplaces and, to an increasing extent, primarily in medical applications, can result, inter alia, in the clouding of the eye lens (cataract). Within the scope of radiation protection precautions, the exposure of the eye lens, inter alia, deserves consideration.

In addition to direct protective measures (e.g., providing a protective device such as safety glasses or a protective visor and adhering to a short exposure time and a large distance), dosimetric monitoring can be indicated in order to permit countermeasures to be taken in a timely manner if it is suspected that the dose accumulated in the vicinity of the eye has exceeded a limit value. Dosimeter devices of the type mentioned at the outset can be utilized, inter alia, for a monitoring of this type. Depending on the intended use, however, said devices can also be utilized in carrying devices which are carried on a body part other than the head.

EP 1 112 526 B1 describes a dosimeter device comprising a measuring element in the form of a dosimeter chip which can be inserted into a plug-in part which is open on one side. The plug-in part and the measuring element are then inserted into a recess in a housing which is fastened, e.g., on a pair of eyeglasses. This embodiment offers insufficient protection of the measuring element, and therefore said element can become damaged. Damage is possible, e.g., if the measuring element is handled directly for evaluation purposes and/or if the plug-in inadvertently falls out of the recess.

SUMMARY OF THE INVENTION

One problem addressed by the present invention is that of providing a dosimeter device comprising a better-protected measuring element for detecting ionizing radiation.

A dosimeter device which solves this problem comprises a carrier part, which includes a closed casing formed of fixedly interconnected walls, which enclose a measuring element for detecting ionizing radiation, and fastening aids for a detachable fastening of the carrier part to a carrying device, which can be carried on a body part of a user. The fastening aids are configured for defining a location of a fastening of the carrier part on the carrying device.

Preferably, the dosimeter device has one or more of the following features:

The carrier part includes a closed casing having a measuring element, which casing, as seen in a top view, has a substantially circular form.

The carrier part comprises protruding arms for forming a bayonet connection with a mating part which can be mounted on or is mounted on the carrying device.

An edge element is formed on the carrier part, which element is designed to be elastic in order to form a snap-in connection. Preferably, a single circumferential edge element is provided, or multiple circumferentially arranged edge elements are provided.

An edge element is formed on the carrier part, which element has a thread for forming a threaded connection with a mating part which can be mounted on or is mounted on the carrying device.

A single-piece or multi-piece mating part is provided, which can be mounted on or is mounted on the carrying device and comprises arms, which can be spread apart for forming a receptacle, into which the carrier part can be inserted in such a way that the arms encompass the carrier part.

A mating part is provided, which has a fastening part, which can be mounted on or is mounted on the carrying device, and an adapter part, wherein the adapter part has a receptacle, into which the carrier part can be inserted and which is detachably connectable to the fastening part, preferably by means of a bayonet connection.

A mating part is provided, which can be mounted on or is mounted on the carrying device and which is designed for forming a pushbutton connection with the carrier part.

A mating part is provided, which can be mounted on or is mounted on the carrying device, to which the carrier part can be detachably connected and which is produced from metal-free material, in particular plastic.

BRIEF DESCRIPTION OF DRAWINGS

The invention is explained in the following on the basis of exemplary embodiments and with reference to figures. In the drawings

DETAILED DESCRIPTION

1st Exemplary Embodiment

Figure 1:
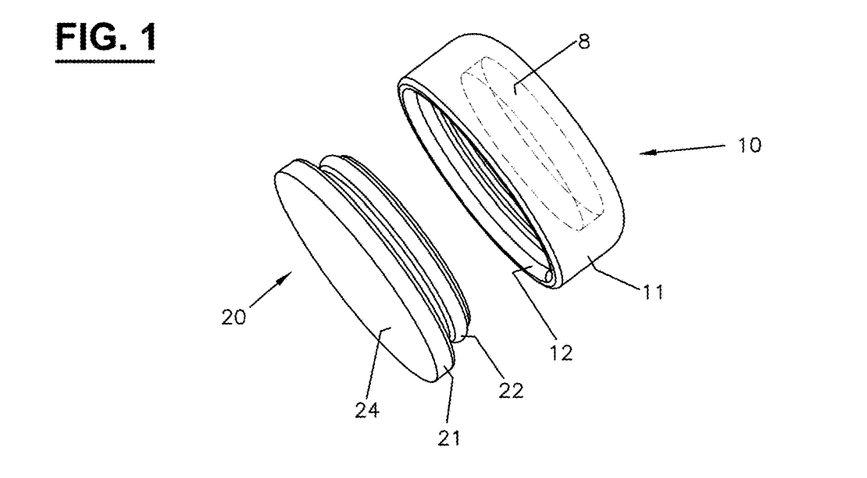
FIG. 1 shows an exploded view of a first exemplary embodiment of a dosimeter device.
Figure 2:
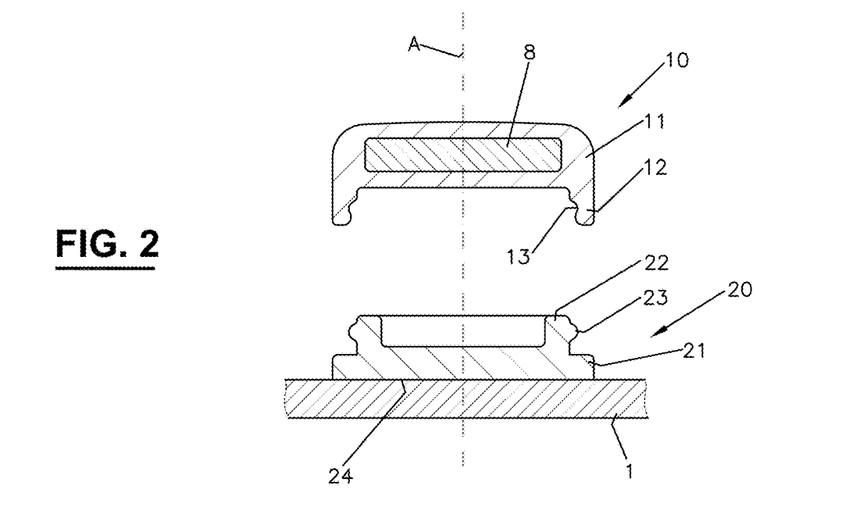
FIG. 2 shows a cut side view of the dosimeter device according to FIG. 1, together with a part of a carrying device.
Figure 3:
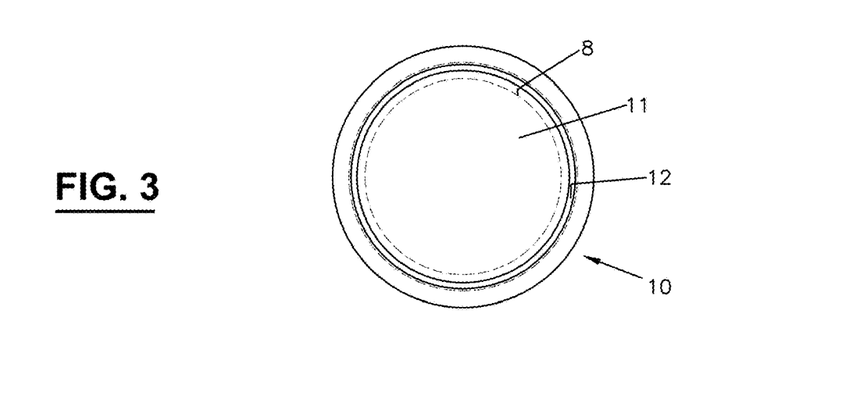
FIG. 3 shows a view from below of the carrier part from FIG. 1.

FIGS. 1-3 show a first exemplary embodiment of a dosimeter device. Said device comprises a measuring element 8 for detecting the radiation dose (e.g., photon radiation or beta radiation), which is accommodated in a carrier part 10. The carrier part 10 includes a closed casing formed of fixedly interconnected walls which enclose the measuring element 8. The walls are produced, e.g., as one-piece and/or are integrally bonded, e.g., by means of adhesive bonding, welding, etc. Preferably, the casing is designed to be free from gaps which extend up to the measuring element 8. If necessary, the casing may be designed to be water-tight.

The measuring element 8 is designed in the shape of a disk and has, e.g., a maximum diameter of less than 20 mm, preferably less than 15 mm, e.g., 10 mm, and a thickness of less than 10 mm, preferably less than 5 mm.

The measuring element 8 is designed, for example, in the form of a passive dosimeter, in particular a thermoluminescent dosimeter (TLD) or a dosimeter based on optically stimulated luminescence (OSL). Passive dosimeters are free from an energy source, e.g., a battery, and generally do not permit a direct read-out of the detected radiation dose. Passive dosimeters are well suited for the monitoring of routine work (interventional medicine, nuclear medicine), since, due to their small dimensions, they can be worn at practically any critical point for measuring the local radiation field.

In the case of a TLD, certain crystals are provided, in which the ionizing radiation generates microscopic changes. The crystals are heated as part of the evaluation, wherein light is emitted depending on the absorbed radiation energy. The light yield is used as the basis for determining the dose which has accumulated over the measured period of time. In the case of an OSL, the read-out takes place by means of optical excitation.

The casing of the carrier part 10 completely encloses the measuring element 8 and forms a cap element 11, from which an edge element 12 protrudes. Said edge element extends about a central axis A, along which the carrier part 10 is displaced with the measuring element 8, in order to enable said part to be mounted on or removed from a mating part 20. In order to manufacture the carrier part 10, the elements 11 and 12 are produced separately and, after insertion of the measuring element 8, are fixedly interconnected, e.g., by means of ultrasonic or laser welding. The casing of the carrier part 10 may also be produced in single-piece form by way of enclosing the measuring element 8 with a hardenable mass.

The mating part 20 for fastening the carrier part 10 includes a base element 21, from which an edge element 22 protrudes, said edge element extending about the central axis A, wherein said base element can be mounted on a carrying device which can be fastened on the head or another body part of a user. FIG. 2 shows only a portion 1 of this carrying device. Said carrying device can be designed, e.g., as a headband, a mask, a cap, an eye protective device such as a pair of eyeglasses, in particular, lead glass protective eyewear, or a visor, in particular, an x-ray protective visor, as a finger ring, etc. (cf. FIGS. 34-39). In the following, the portion 1 of the carrying device is also referred to as the "carrying portion". In the case of protective eyewear, the preferred position of the mating part 20 is on the inside, in the vicinity of the eye, i.e., typically on the lateral shield.

The two edge elements 12 and 22 are designed in such a way that the carrier part 10 can be detachably fastened on the mating part 20. Here, the edge parts 12 and 22 are designed for forming a snap-in connection. Therefore, a connection between the carrier part 10 and the mating part 20 which is similar to that of a pushbutton may be provided. The edge element 12 of the carrier part 10 has an inner surface which is provided with a groove 13 extending about the central axis A, and the edge element 22 of the mating part 20 includes an outer surface which comprises a ridge 23 extending about the central axis A. The edge parts 12, 23 are designed to be movable in an elastic manner in the radial direction.

When the carrier part 10 is mounted on the mating part 20, the edge element 12 of the carrier part 10 comes into contact with the ridge 23 of the mating part 20. As a result, the edge element 12 expands outward and/or the edge element 22 is pressed inward, and therefore the edge element 12 can be slid over the ridge 23. Once the edge element 12 engages behind the ridge 23, the edge element 12, 22 snaps back into the starting position. The ridge 23 now lies in the groove 13.

In the variant according to FIGS. 1 and 2, the mating part 20 can be fastened via the underside 24 thereof on the carrying portion 1, e.g., by adhesive bonding. For this purpose, the underside 24 is designed to be flat and closed.

Figure 4:
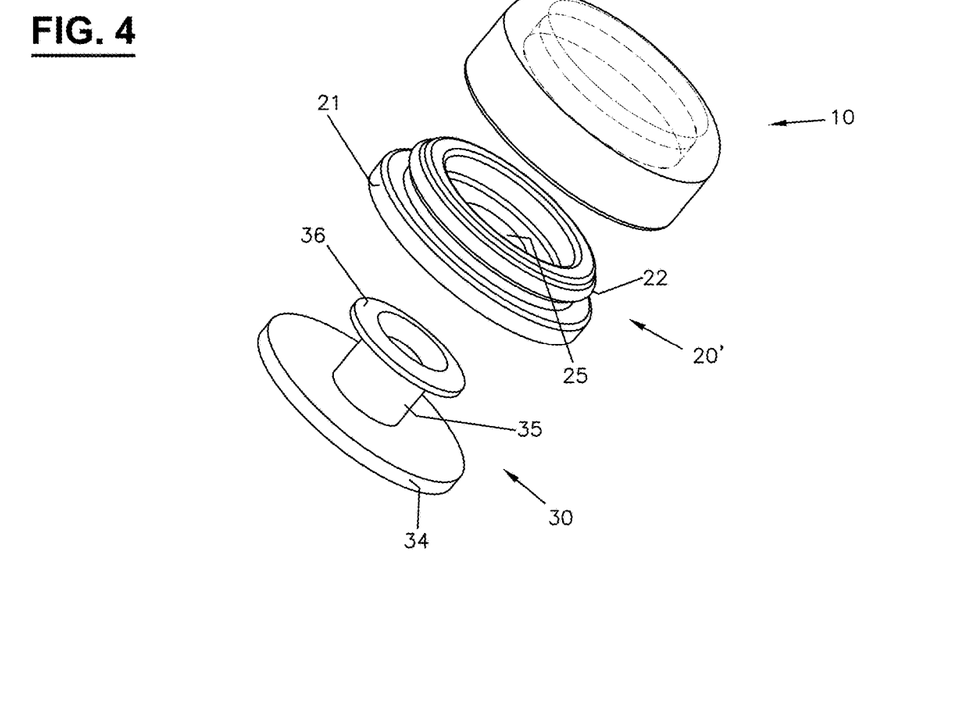
FIG. 4 shows an exploded view of a variant of the dosimeter device according to FIG. 1.
Figure 5:
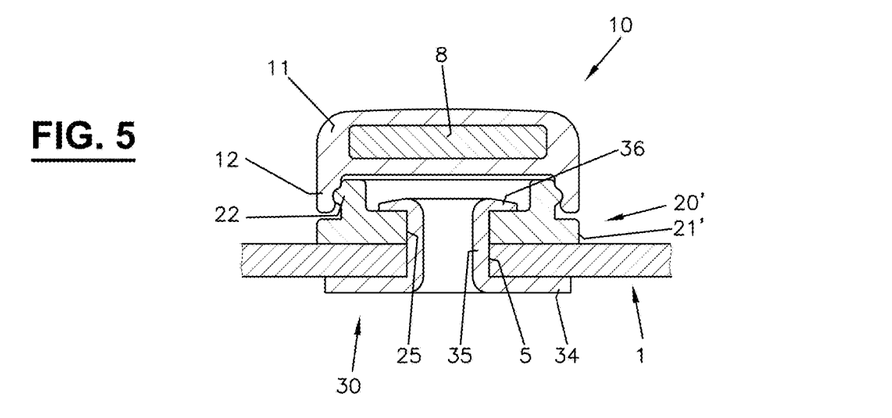
FIG. 5 shows a cut side view of the dosimeter device according to FIG. 4, together with a part of a carrying device.

The mating part may also be designed to be fastenable in another way. FIGS. 4 and 5 show a variant, in which the base element 21' of the mating part 20' has a through-hole 25. The carrying portion 1, which includes the area of the carrying device provided for fastening the mating part 20', likewise has a through-hole 5. A connection part 30, which is designed similar to a rivet, is provided for the purpose of fastening. The connection part 30 includes a tubular intermediate element 35 which, in the installed state, passes through both through-holes 5 and 25 and comprises an end element 34 and 36, respectively at each of the ends thereof. As shown in FIG. 5, the back-side end element 34 rests against the back side of the carrying portion 1. The front-side end element 36 rests against the inner side of the base element 20'. The carrying portion 1 is situated between the elements 21' and 34.

The carrier part 10 and its fastening on the base part 21' via the edge elements 12 and 22 is designed similar to the variant according to FIGS. 1-3.

In FIG. 5, the front-side end element 36 is shown already in the deformed state thereof. Before installation, the end element 36 has a diameter which is smaller than the diameter of the through-holes 5 and 25, and, therefore, can be slid through said through-holes. The end element 36 is then deformed in a suitable way, e.g., by a mechanical and/or thermal effect, and therefore the diameter of the end element 36 is increased and covers the through-hole 25 in the base element 21'.

The variant according to FIG. 5 may be utilized, in particular, for fastening the carrier part 10 to a carrying device made from a flexible material, for example, a textile, as is the case, e.g., with a cap or a mask.

2nd Exemplary Embodiment

Figure 6:
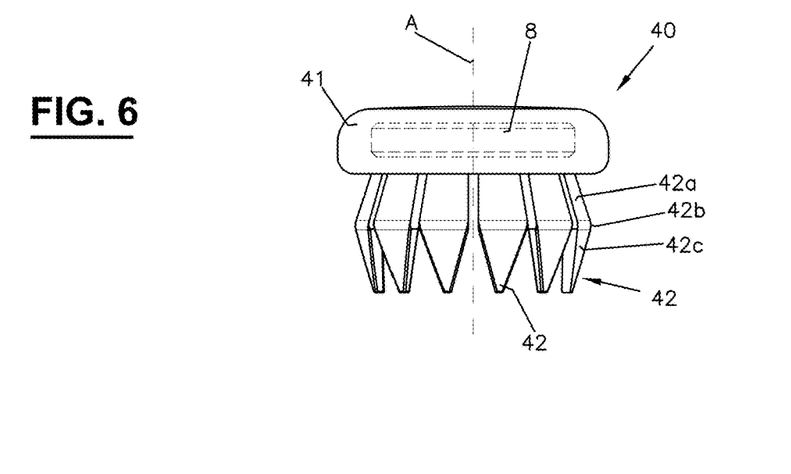
FIG. 6 shows a side view of a second exemplary embodiment of a dosimeter device.
Figure 7:
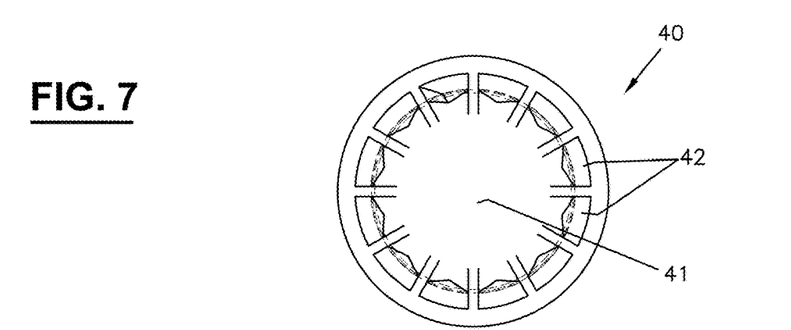
FIG. 7 shows a view from below of the dosimeter device according to FIG. 6.
Figure 8:
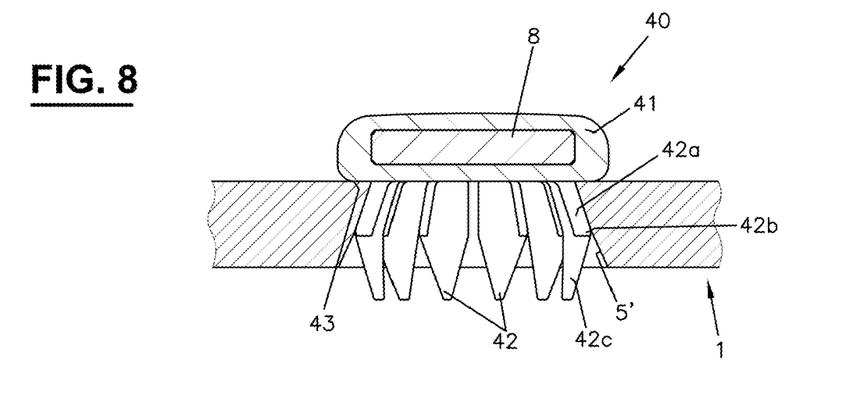
FIG. 8 shows a cut side view of the dosimeter device according to FIG. 6, together with a part of a carrying device.

FIGS. 6-8 show a second exemplary embodiment of a dosimeter device which is designed for a snap-in connection, as is also the case with the first exemplary embodiment.

Similarly to the first exemplary embodiment, the carrier part 40 comprises a cap element 41 which forms a casing for the measuring element 8. In addition, the carrier part 40 has an edge region which is designed here to be lamellar, thereby resulting in multiple tabs 42 which protrude from the cap element 41 and are arranged about the central axis A.

The individual tabs 42 are designed to be elastic in the radial direction. A tab 42 comprises a first section 42a which is fastened on the cap element 41 and extends away from the central axis A. Attached to the first section 42a is a second section 42c which extends toward the central axis A. The tab 42 therefore includes a transition 42b which is situated furthest away from the central axis A, as viewed radially, and which is designed as a sharp bend in this case. The second section 42c forms the end of the tab 42, which has a tapering shape in this case.

A hole 5' formed in the carrying portion 1 is used as the mating part for fastening the carrier part 40.

The carrier part 40 comprising the measuring element 8 can be fastened on the carrying portion 1 by means of a snap-in connection. When the carrier part 41 is inserted into the hole 5', the transition 42b of each tab 42 comes in contact with the edge of the hole 5', and therefore the tabs 42 are moved inward. As the insertion continues, the tabs 42 spring outward again.

This springing back is made possible, e.g., by way of the hole 5' having a shape which deviates from a circular-cylindrical shape. In the example according to FIG. 8, the hole 5' expands in the direction in which the tabs 42 are inserted. In the inserted state, a first section 42a of a tab 42 rests against the edge which defines the hole 5'. In this case, the tabs 42 protrude slightly or not at all from the back side of the carrying portion 1 and therefore protrude hardly at all or not at all.

It is also conceivable to select the length of the first section 42a of a tab 42 in such a way that said section can extend through the carrying portion 1. After insertion, the transition 42b therefore reaches the back side of the carrier part 1, and therefore the tabs 42 can spring back into the starting position. The end 42c then protrudes completely out of the back side of the carrying portion 1. In this variant, the hole 5' may be circular-cylindrically shaped.

The tabs 42 are disposed so as to be offset from the edge of the cap element 41, as viewed in the radial direction. In the installed state according to FIG. 8, a portion of the underside 43 of the cap element 41 rests against the front side of the carrying portion 1.

Figure 9:
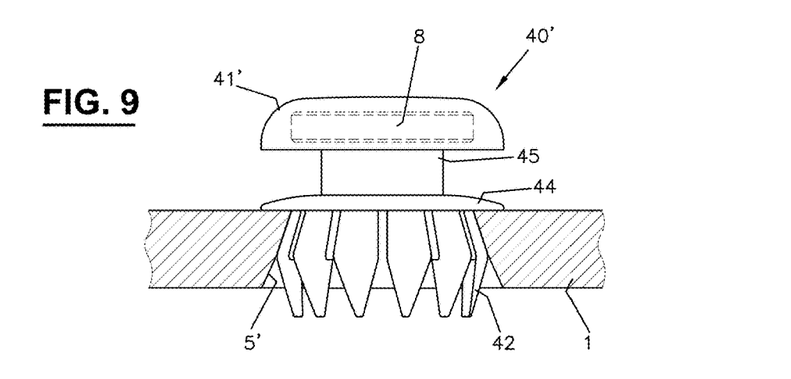
FIG. 9 shows a partially cut side view of a variant of the dosimeter device according to FIG. 6, together with a part of a carrying device.

The front-side end of the carrier part may also have a different design. In this way, e.g., as shown in FIG. 9, in the case of the carrier part 40', a stop element 44 and an intermediate element 45 may be provided, which are situated between the cap element 41' and the tabs 42. As viewed in the radial direction, the intermediate element 45 is designed to be narrower than the cap element 41'. Said cap element therefore extends laterally past the intermediate element 45. After installation, the stop element 44 rests against the front side of the carrying portion 1 and covers the hole 5'.

The cap element 41', which encloses the measuring element 8, is situated so as to be axially offset, via the intermediate element 45, relative to the stop element 44. As a result, more space for handling is created. The offset arrangement of the cap element 41' makes it easier, in particular, to grip underneath said element using the fingers and remove said element, via pulling, from the carrying portion 1.

As a further variant, a ring may be provided as a mating part which can be fastened on the carrying portion 1, e.g., by adhesive bonding, and which defines a hole for the insertion of the tabs 42 of the carrier part 40, 40'. In this variant, the hole 5' for fastening on the carrying portion 1 can therefore be dispensed with.

3rd Exemplary Embodiment

Figure 10:
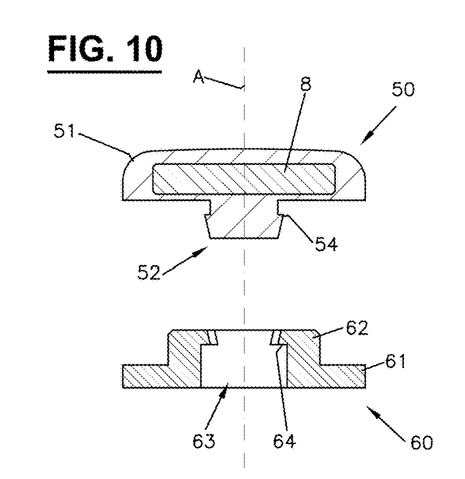
FIG. 10 shows a cut side view of a third exemplary embodiment of a dosimeter device.
Figure 11:
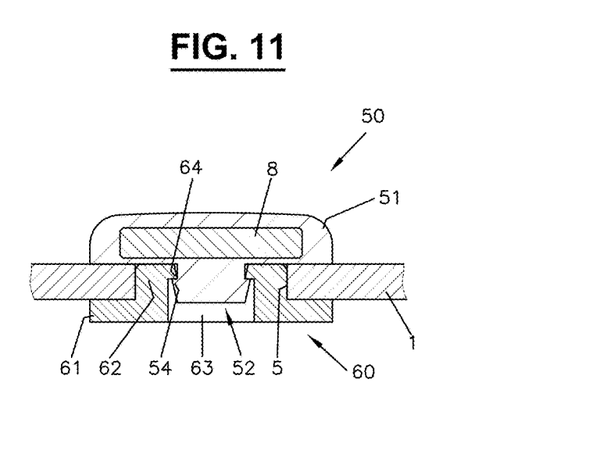
FIG. 11 shows the dosimeter device from FIG. 10, mounted on a carrying device.

FIGS. 10 and 11 show a third exemplary embodiment of a dosimeter device which is likewise designed for a snap-in connection.

Similarly to the two first exemplary embodiments, the carrier part 50 comprises a cap element 51 which is used as a closed casing for the measuring element 8. Protruding from the cap element 51 is a peg 52 which is designed for engaging with a mating part 60 in order to form a pushbutton connection. The mating part 60 includes a base element 61, from which an edge element 62 protrudes, said edge element extending about the central axis A. The mating part 60 has a hole 63, into which the peg 52 can be inserted.

The peg 52 has an outer surface having a thickened region 54 which forms a step in this case. The inner surface of the hole 63 comprises a corresponding undercut 64, behind which the thickened region 54 can engage. For this purpose, the shape and elasticity of the peg 52 are designed in such a way that the thickened region can be pressed through the constriction defined by the undercut 64.

In the assembled state according to FIG. 11, the edge element 62 extends into the through-hole 5 of the carrying portion 1. The peg 52 has been inserted into the opening 63, and therefore said peg is engaged with the undercut 64. The carrying portion 1 is situated between the two parts 50 and 60. In this exemplary embodiment, the mating part 60 does not necessarily need to be additionally fastened on the carrying portion 1, but rather is held due to the connection of the peg 52 with the inner surface of the hole 63.

In order to separate the two parts 50 and 60, a sufficiently great removal force is applied on the carrier part 50, and therefore the thickened region 54 slips through the constriction formed by the undercut 64 and, finally, the peg 52 can be removed in entirety from the hole 63.

4th Exemplary Embodiment

Figure 12:
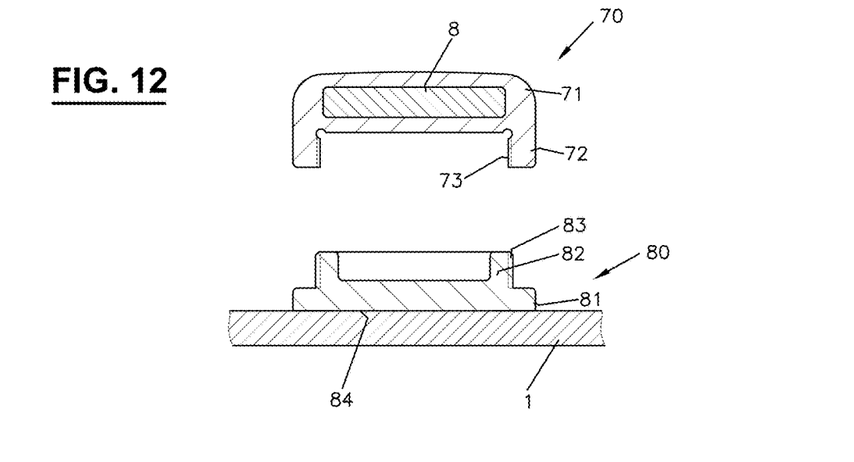
FIG. 12 shows a cut side view of a fourth exemplary embodiment of a dosimeter device, together with a part of a carrying device.

FIG. 12 shows a further exemplary embodiment which is designed similar to the first exemplary embodiment and comprises the following components:
a carrier part 70 having a cap element 71 which comprises a casing for enclosing the measuring element 8, and having an edge element 72 protruding therefrom,
a mating part 80 having a base part 81 and an edge element 82 protruding therefrom.

In contrast to the first exemplary embodiment, the edge elements 72 and 82 are not designed for a snap-in connection, but rather for a threaded connection. For this purpose, the edge element 72 comprises an inner thread 73 which can engage into an outer thread 83 formed on the edge element 82. The carrier part 70 can be screwed together with the mating part 80 for assembly.

In the example according to FIG. 12, the mating part 80 can be fastened, via the underside 84 thereof, on the carrying portion 1. Similar to the variant according to FIG. 5, the mating part 80 may be provided with a through-hole, in order to enable said mating part to be fastened on the carrying portion 1 by means of a connection element, e.g., such as that according to FIG. 4.

5th Exemplary Embodiment

FIGS. 13-17 show a further exemplary embodiment which is also designed for forming a snap-in connection. The carrier part 90 is designed as a substantially circular disk part which forms a closed casing for accommodating the measuring element 8.

Figure 13:
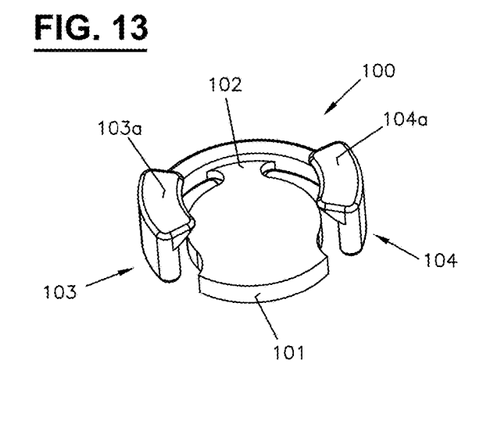
FIG. 13 shows a perspective view of the mating part which belongs to a fifth exemplary embodiment of a dosimeter device.
Figure 14:
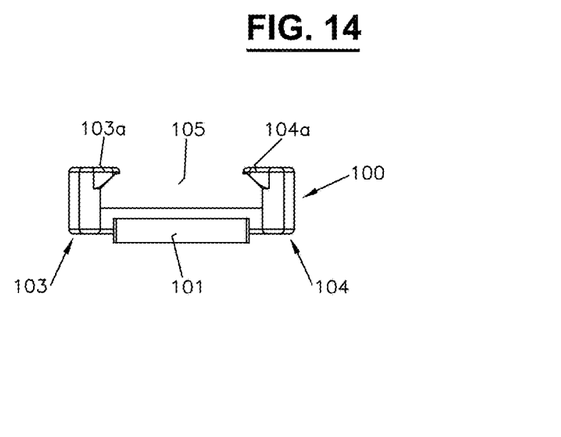
FIG. 14 shows a front view of the mating part from FIG. 13.
Figure 15:
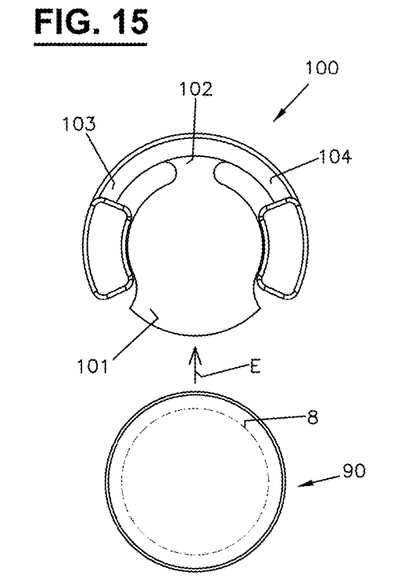
FIG. 15 shows a top view of the mating part from FIG. 13, together with a carrier part.

The mating part 100 comprises a base element 101 which is disk-shaped and, on the side thereof, has a connection region 102. Fastened on said region are two laterally springy arms 103, 104. The arms 103, 104 are each provided with a stop element 103a, 104a and terminate so as to be separated by a distance which is smaller than the maximum diameter of the carrier part 90. The arms 103, 104 having the stop elements 103a, 104a define a receptacle 105, in which the carrier part 90 can be accommodated. For this purpose, the carrier part 90 can be inserted into the receptacle 105 via displacement in the displacement direction E.

Figure 17:
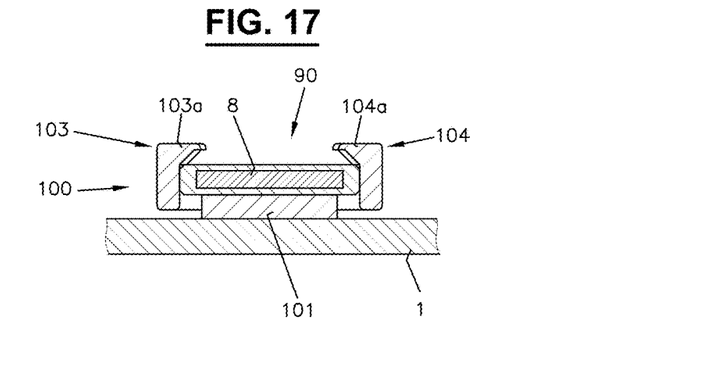
FIG. 17 shows a cut side view of the mating part and carrier part from FIG. 16, together with a part of a carrying device.

The mating part 100 is fastened on the carrying portion 1, by being adhered thereto, e.g., via the underside of the base element 101. The carrier part 90 can be installed by being inserted laterally into the opening defined by the ends of the arms 103, 104, thereby spreading said arms apart. In FIG. 15, the direction in which the carrier part 90 is displaced for insertion is labeled using the arrow E.

Figure 16:
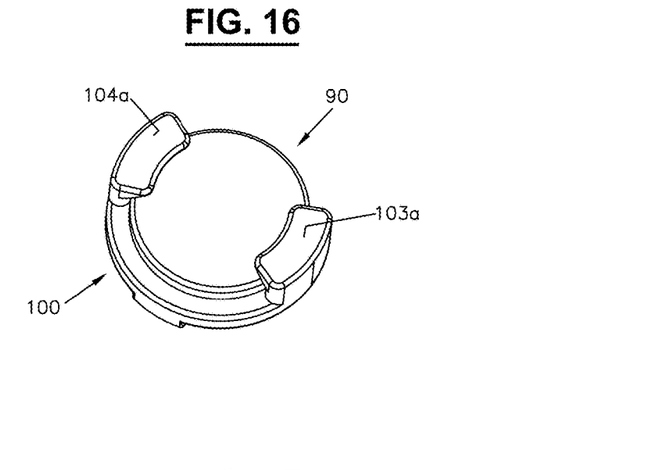
FIG. 16 shows a perspective view of the mating part and the carrier part from FIG. 15, in the joined state.

Once the carrier part 90 has been completely inserted, the arms 103, 104 spring back into their starting position. The stop elements 103a, 104a extend inwardly, as viewed radially, and therefore said elements at least partially rest against the carrier part 90 and secure said part in the axial direction. (The designations "radial" and "axial" used here are based on the axis which extends transversely to the direction E and about which the arms 103, 104 extend.) The carrier part 90 is held in place in such a way that its front side is exposed, thereby ensuring access to the measuring element 8 for receiving the radiation to be detected.

For release, a sufficiently great pulling force is applied on the carrier part 90, and therefore the arms 103, 104 are spread apart and the ends are spaced so far apart that the carrier part 90 can be slid through.

6th Exemplary Embodiment

FIGS. 18-28 show a further exemplary embodiment of a dosimeter device which is designed for forming a combination of a snap-in connection and a bayonet connection. The carrier part 90 is designed similarly to the fifth exemplary embodiment and, therefore, is designed as a substantially circular disk part which forms a closed casing for the measuring element 8.

Figure 18:
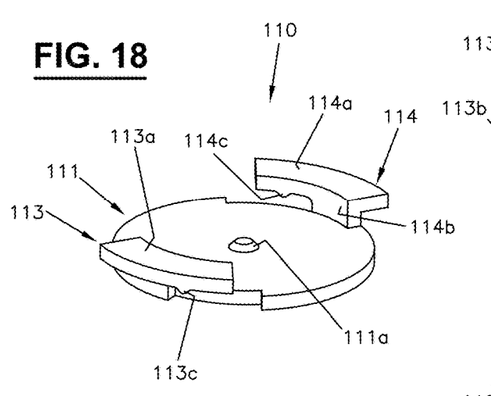
FIG. 18 shows a perspective view of the fastening part of a mating part which belongs to a sixth exemplary embodiment of a dosimeter device.
Figure 19:
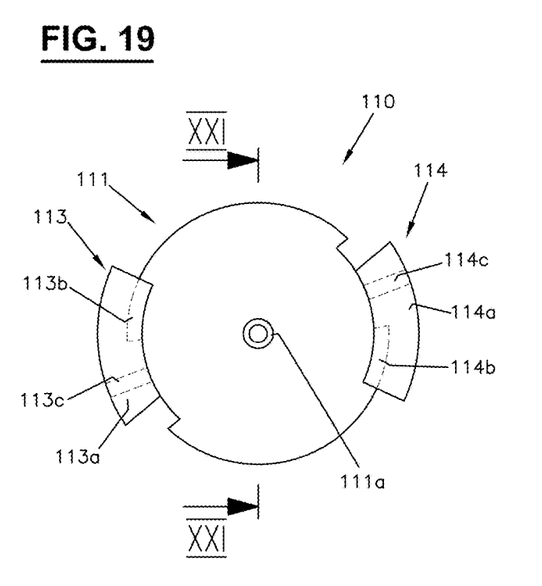
FIG. 19 shows a top view of the fastening part from FIG. 18.
Figure 20:
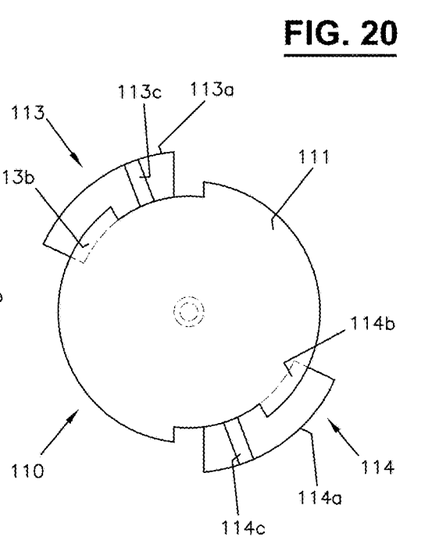
FIG. 20 shows a view from below of the fastening part from FIG. 18.
Figure 21:
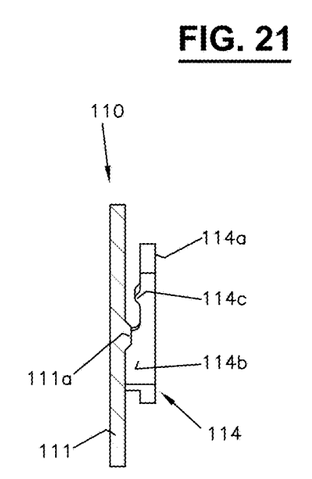
FIG. 21 shows the fastening part from FIG. 18 in a view cut along the line XXI-XXI according to FIG. 19.
Figure 22:
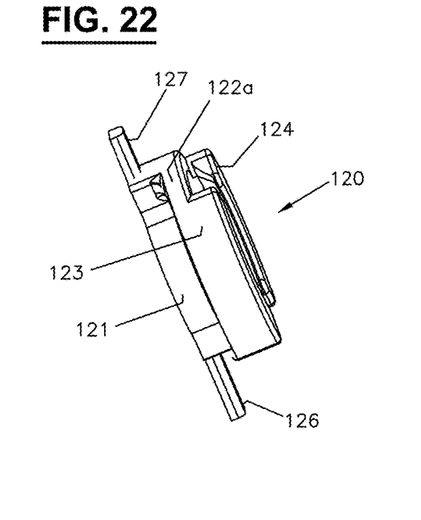
FIG. 22 shows a perspective view of the adapter part of the mating part which belongs to the sixth exemplary embodiment.
Figure 23:
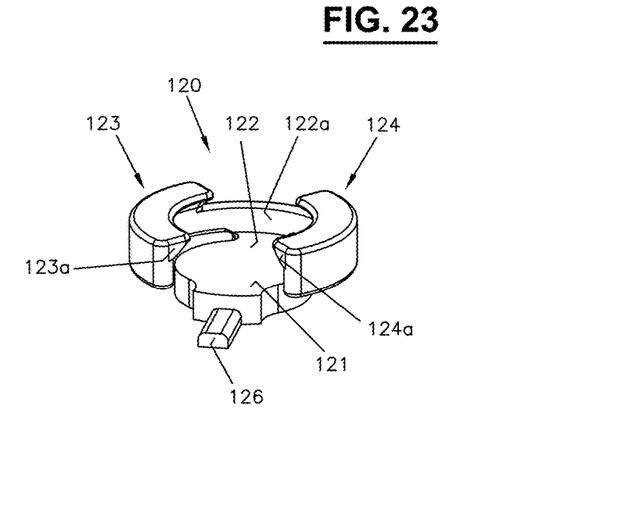
FIG. 23 shows another perspective view of the adapter part from FIG. 22.
Figure 24:
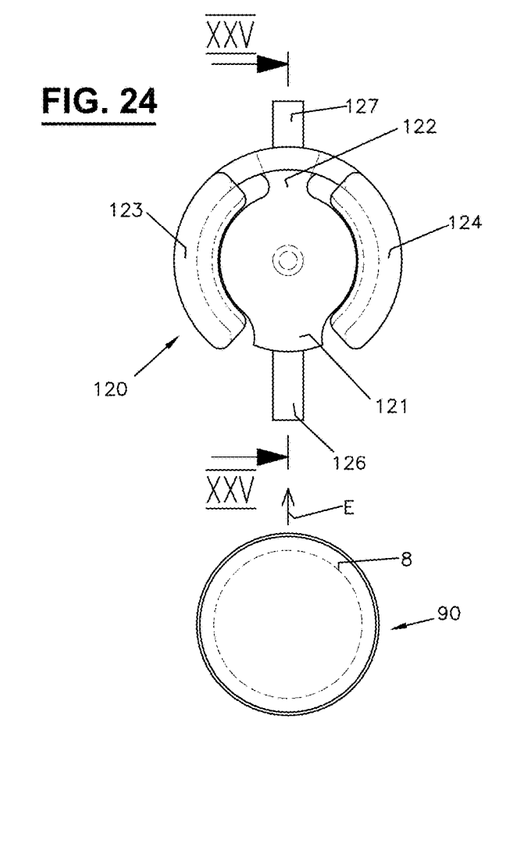
FIG. 24 shows a top view of the adapter part from FIG. 22, together with a carrier part.
Figure 25:
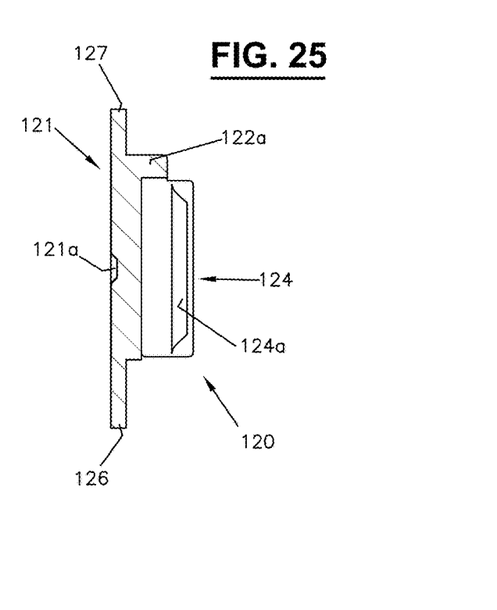
FIG. 25 shows the adapter part from FIG. 22 in a view cut along the line XXV-XXV according to FIG. 24.

The mating part has a two-piece design and includes a fastening part 110 and an adapter part 120.

The fastening part 110 is represented in FIGS. 18-21. Said part comprises a base element 111 which is disk-shaped and on which connection elements 113, 114 are situated. The base element 111 comprises a locking projection 111a which is situated, e.g., in the center.

Each connection element 113, 114 comprises a wing piece 113a, 114a which is situated so as to be axially offset with respect to the base element 111 and which is elastically connected thereto via a wall 113b, 114b. Situated on the underside of a wing piece 113a, 114a is a locking projection 113c, 114c which is situated so as to be spaced from the wall 113b, 114b. This spacing corresponds to the thickness of a locking arm 126, 127 of the adapter part 120.

The adapter part 120 is represented in FIGS. 22-26. For the purpose of forming a snap-in connection with the carrier part 90, the adapter part 120 includes components similar to the mating part 100 of the fifth exemplary embodiment, namely:
a base element 121 which is disk-shaped in this case, and two laterally springy arms 123, 124 which are fastened to the base element 121 via a lateral connection region 122 and each of which is provided with a stop element 123a, 124a.

The arms 123, 124, together with the stop elements 123a, 124a, define a receptacle, into which the carrier part 90 can be inserted via displacement in the displacement direction E. The connection region 122 comprises an axially and circumferentially extending wall 122a which defines a stop in the displacement direction E.

In addition to the mating part 100 according to the fifth exemplary embodiment, the adapter part 120 includes locking arms 126, 127 which are fastened, diametrically opposed to one another, on the base element 121 and extend radially outward, and a locking indentation 121*a*, into which the locking projection 111*a* of the fastening part 110 can engage.

Figures 26, 27:
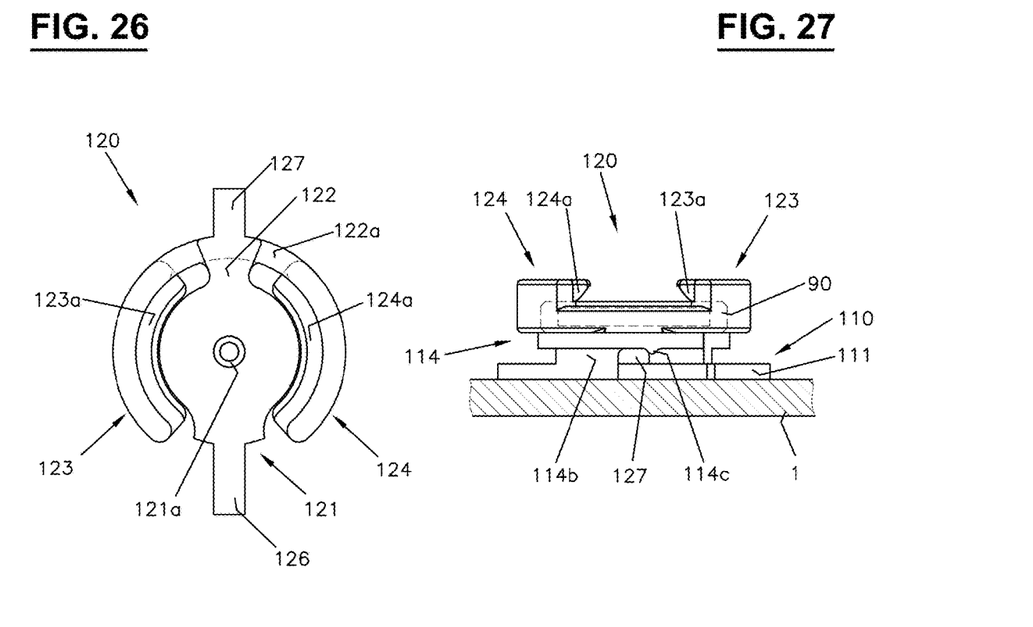
FIG. 26 shows a view from below of the adapter part from FIG. 22.
FIG. 27 shows a side view of the parts from FIGS. 18 and 24 in the assembled state, together with a part of a carrying device.

The fastening part 110 is fastened on the carrying portion 1 by being adhered thereto, e.g., via the underside of the base element 111. It is also conceivable to produce the fastening part 110 as an integral component of the carrying portion 1, by, e.g., integrally forming said fastening part with a wall of the carrying portion 1.

Figure 28:
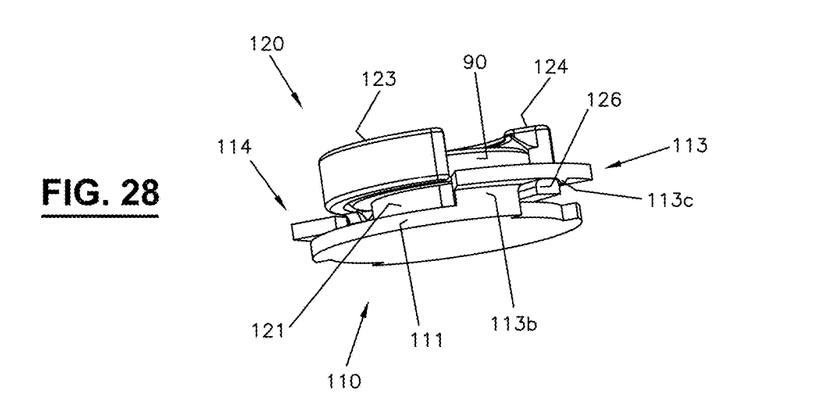
FIG. 28 shows a perspective view of the dosimeter device according to FIG. 27, although without a carrying device.

The carrier part 90 can be mounted on the fastening part 110 by means of the adapter part 120. For this purpose, the carrier part 90 is slid into the opening defined by the ends of the arms 123, 124 of the adapter part 120, and the adapter part 120, together with the carrier part 90, is positioned on the fastening part 110 in such a way that the base elements 111 and 121 come to rest against one another, the locking projection 111*a* engages into the locking indentation 121*a*, and the locking arms 126, 127 can be rotated under the wing pieces 113*a*, 114*a*. In the final position as shown in FIGS. 27 and 28, a locking arm 126, 127 is located between the locking projection 113*c*, 114*c* and the wall 113*b*, 114*b*, respectively.

By means of rotation in the opposite direction, the locking arms 126, 127 can be moved past the locking projections 113*c*, 114*c* again, and therefore the adapter part 120, together with the carrier part 90, can be disconnected from the fastening part 110.

By applying a pulling force on the carrier part 90, the arms 123, 124 of the adapter part 120 are spread apart, and therefore the carrier part 90 can be removed from the adapter part 120.

7th Exemplary Embodiment

FIGS. 29-33 show a further exemplary embodiment of a dosimeter device which is designed for forming a bayonet connection. This example is a modification of the sixth exemplary embodiment, the adapter part 120 having been omitted. For this purpose, locking arms 136, 137 are formed directly on the carrier part 130, which arms are diametrically opposed and extend radially outward (cf. FIGS. 29 and 30).

Figure 29:
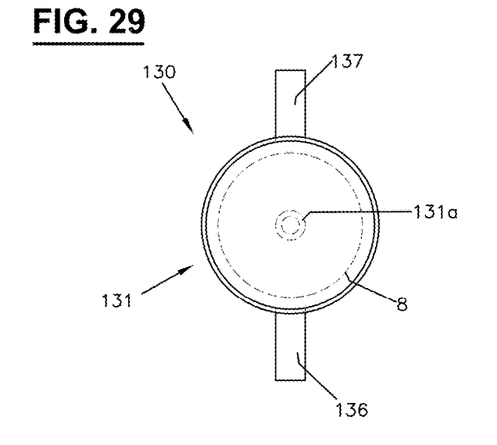
FIG. 29 shows a top view of a carrier part which belongs to a seventh exemplary embodiment of a dosimeter device.
Figure 30:
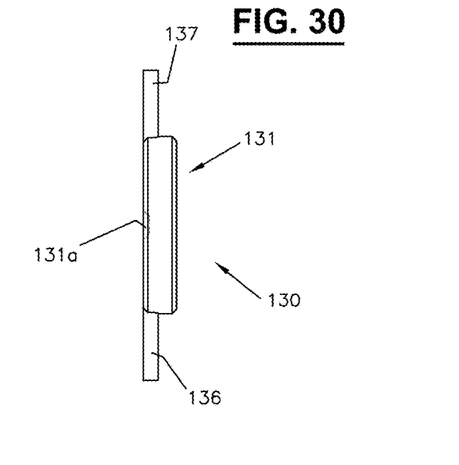
FIG. 30 shows a side view of the carrier part from FIG. 29.

The carrier part 130 comprises a main body 131 which is designed as a circular disk part in this case and forms a closed casing for the measuring element 8. Preferably, the main body 131 is provided with a locking indentation 131*a* for engagement with the locking projection 111*a* of the fastening part 110. The latter is designed the same as in the sixth exemplary embodiment.

Figure 31:
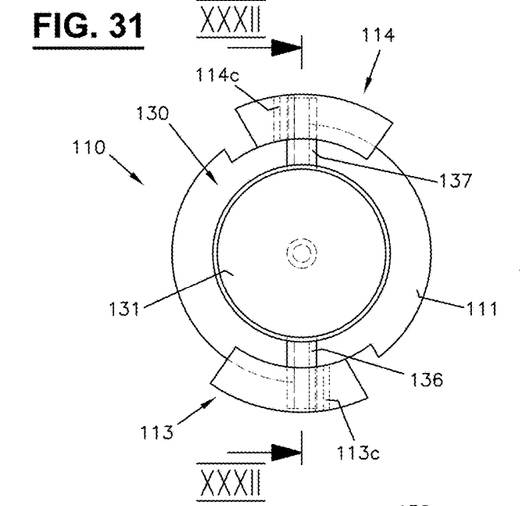
FIG. 31 a top view of the fastening part from FIG. 18, together with a carrier part according to FIG. 29 fastened thereon.
Figure 32:
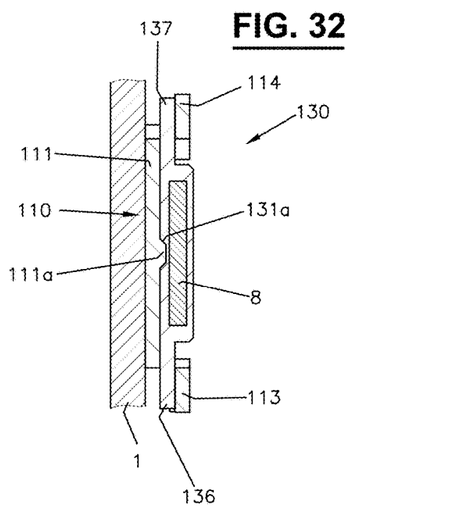
FIG. 32 shows a view cut along the line XXXII-XXXII of the dosimeter device according to FIG. 31, together with a part of a carrying device.
Figure 33:
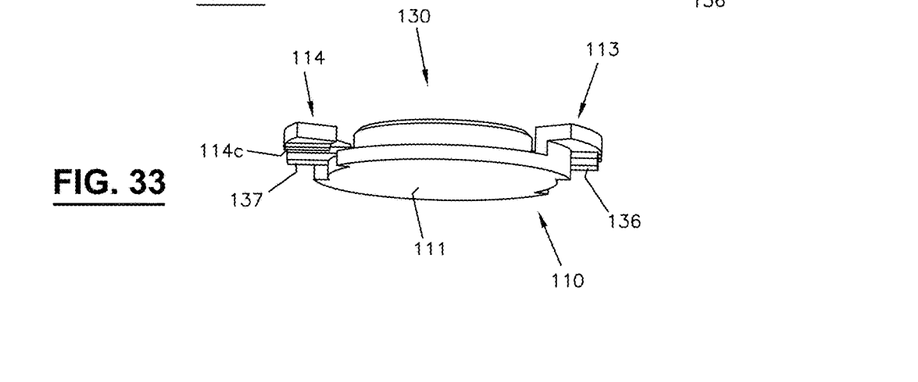
FIG. 33 shows a perspective view of the dosimeter device according to FIG. 32, although without a carrying device.
Figure 34:
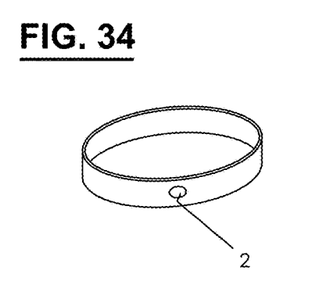
FIG. 34 shows a headband comprising a dosimeter device according to the invention.
Figure 35:
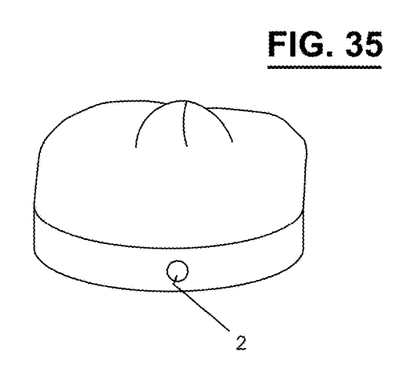
FIG. 35 shows a cap comprising a dosimeter device according to the invention.
Figure 36:
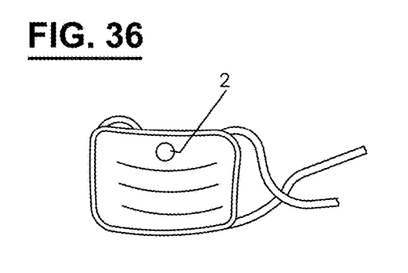
FIG. 36 shows a mask comprising a dosimeter device according to the invention.
Figure 37:
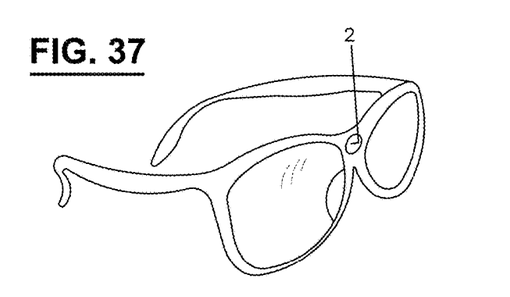
FIG. 37 shows a pair of eyeglasses comprising a dosimeter device according to the invention.

The carrier part 130 is positioned on the fastening part 110 in such a way that the main body 131 comes to rest on the base element 111, the locking projection 111*a* engages into the locking indentation 131*a*, and the locking arms 136, 137 can be rotated under the wing pieces 113*a*, 114*a*. In the final position as shown in FIGS. 31 to 33, a locking arm 136, 137 is located between the locking projection 113*c*, 114*c* and the wall 113*b*, 114*b*, respectively.

By means of rotation in the opposite direction, the locking arms 136, 137 can be moved past the locking projections 113*c*, 114*c* again, and therefore the carrier part 130 can be disconnected from the fastening part 110.

The parts 10, 20, 20', 30, 40, 40', 50, 60, 70, 80, 90, 100, 110, 120, 130 are preferably produced from metal-free material, e.g., plastic. As a result, an unwanted scattering of the radiation to be measured is prevented. Preferably, the carrier part 10, 40, 40', 50, 70, 90, 130 and/or the mating part 20, 20', 30, 60, 80, 100, 110, 120 are/is produced from a material which is suitable for medical use and, e.g., is as chemical-resistant as possible. The material is selected in such a way that no reactions occur upon contact with the body and/or the carrier part 10, 40, 40', 50, 70, 90, 130 can be produced having a smooth surface, in order, inter alia, to prevent the accumulation of bacteria. For instance, plastic such as polyamide is used as the material.

The carrier part 10, 40, 40', 50, 70, 90, 130 comprises a casing which encloses the measuring element 8 and which is formed from fixedly interconnected walls. Unintended damage to the measuring element 8 is thereby prevented.

Preferably, the casing, as seen in a top view, has a substantially circular form, wherein the maximum diameter of the casing is less than 25 mm and, particularly preferably, is less than 20 mm.

In addition, the material of the carrier part 10, 40, 40', 50, 70, 90, 130 is selected in such a way that said material is transparent for the radiation to be detected and/or is similar to bodily tissue.

In order to form the carrier part 10, 40, 40', 50, 70, 90, 130, e.g., multiple separate elements, e.g., in the form of the elements 11 and 12 of the carrier part 10, are provided and, after insertion of the measuring element 8, are fixedly interconnected, e.g., by ultrasonic or laser welding. It is also conceivable to produce the carrier part 10, 40, 40', 50, 70, 90, 130 as a single piece, e.g., from a plastic.

Preferably, the carrier part 10, 40, 40', 50, 70, 90, 130 can be cleaned and/or disinfected for medical use, without the enclosed measuring element 8 thereby coming into contact with the cleaning agent or disinfectant which is used.

The components 5, 5', 12, 20, 20', 30, 42, 52, 60, 72, 80, 100, 110, 120, 136, 137 form fastening aids for the detachable fastening of the carrier part 10, 40, 40', 50, 70, 90, 130 to a carrying device 1. The fastening is designed in such a way that the carrier part comes to rest at a defined location on the carrying device. A part of the fastening aids may be an integral component of the carrying device 1. For example, it is conceivable to provide the mating part 20, 80, 100 and/or 110 already during the production of the carrying device 1, by integrally forming said mating part with a wall of the carrying device 1. Alternatively, a separate mating part may be provided, which is fastened at the desired location on the prefabricated carrying device 1. The mating part defines the location at which the carrier part is detachably mounted. In general, a location on the carrying device 1 at which the carrier part can be detachably mounted is defined by means of the fastening aids.

When the carrier part is used, the measuring position thereof is therefore known. This makes it possible, upon detection of an elevated dose, to more precisely reconstruct the radiation event and to better assess the radiation risk. In addition, measurements which were carried out, e.g., for consecutive monitoring periods, can be better compared with one another.

If the measuring element 8 is utilized as a passive dosimeter, the carrier part 10, 40, 40', 50, 70, 90, 130 is removed after the monitoring period and is sent to the evaluation site for the dose determination. It is therefore not necessary to send the entire carrying device 1 to the evaluation site for evaluation. For the purpose of evaluation, the carrier part 10, 40, 40', 50, 70, 90, 130 is opened, e.g., by being cut open. Said carrier part is generally destroyed as a result. The measuring element 8 is removed and evaluated. Said element may be re-used at a later time by enclosing it in a new carrier part 10, 40, 40', 50, 70, 90, 130. By using the new carrier part 10, 40, 40', 50, 70, 90, 130, the carrying device 1 is equipped for the next monitoring period.

Figures 38, 39:
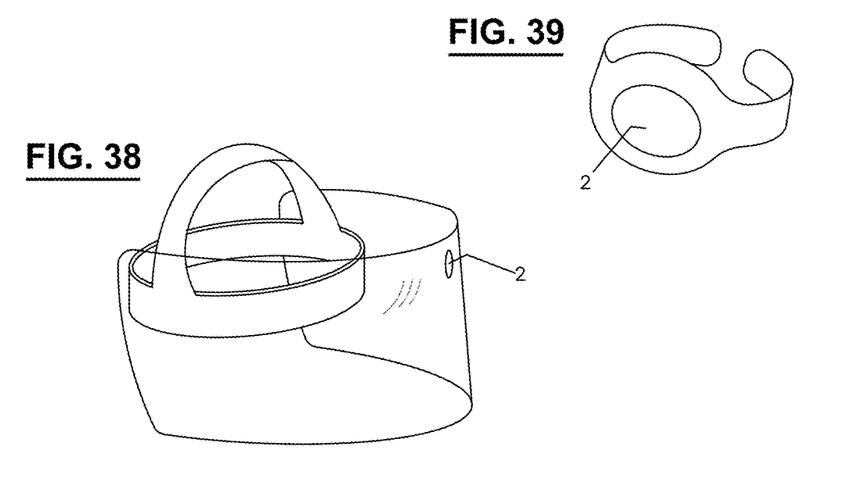
FIG. 38 shows a visor comprising a dosimeter device according to the invention.
FIG. 39 shows a finger ring comprising a dosimeter device according to the invention.

The dosimeter device described here can be utilized in diverse ways. FIGS. 34-39 show examples of carrying devices, each of which is provided with a dosimeter device 2, i.e., a head band (FIG. 34), a cap (FIG. 35), a mask (FIG. 36), a pair of eyeglasses (FIG. 37), a visor (FIG. 38), and a finger ring (FIG. 39).

Unless already described, the dosimeter devices described here have the following advantages:

The amount of material used for providing the carrier parts has been reduced. The measurement position on the body part of the user is defined, and therefore traceability is ensured in the event that elevated dose values are suspected. Wearing the dosimeter device is not irritating to the user. The measuring element can be mounted easily and reliably, and said element can be easily exchanged.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An arrangement including a pair of eyeglasses as a carrying device to be carried on a head of a user and a dosimeter device, the dosimeter device comprising:
   a carrier part, which includes a closed casing formed of fixedly interconnected walls formed as one-piece or integrally bonded to each other to be water-tight, which enclose a measuring element for detecting ionizing radiation different from sunlight, wherein the measuring element is a passive dosimeter free from an energy source and which does not permit a direct read-out of the detected radiation dose, and wherein the pair of eyeglasses and the dosimeter are free of electronic components and free of any electrical connector,
   fastening aids for a detachable fastening of the carrier part to said carrying device, wherein the fastening aids are configured to provide a mechanical connection to the carrying device, and excluding fastening aids that fasten by only frictional forces or that include a strap member;
   wherein the fastening aids are configured for defining a location of a fastening of the carrier part on the carrying device and are also configured so that the measuring element is positioned in a predetermined position on the inside of the pair of eyeglasses in the vicinity of an eye on a lateral shield, and
   wherein the measuring element is configured to prohibit a direct evaluation of the ionizing radiation detected when fastened to the pair of eyeglasses.

2. The arrangement according to claim 1, wherein the fastening aids are configured for forming at least one of a snap-in connection, a bayonet connection, and a threaded connection.

3. The arrangement according to claim 1, wherein the casing, as seen in a top view, has a substantially circular form.

4. The arrangement according to claim 3, wherein a maximum diameter of the casing is less than 25 mm.

5. The arrangement according to claim 1, wherein the fastening aids include at least one edge element, which is formed on the carrier part and is designed to be elastic in order to form a snap-in connection.

6. The arrangement according to claim 5, wherein the carrier part can be fastened on the carrying device via displacement along a displacement axis, and the carrier part comprises multiple edge elements, which are arranged about the displacement axis and are movably radially thereto.

7. The arrangement according to claim 1, wherein the fastening aids comprise a mating part, which can be mounted or is mounted on the carrying device, which mating part is designed for forming a pushbutton connection with the carrier part.

8. The arrangement according to claim 1, wherein the fastening aids comprise a hole formed in the carrying device, into which an end of the carrier part can be inserted.

9. The arrangement according to claim 1, wherein the fastening aids include a mating part, which can be mounted on or is mounted on the carrying device and which comprises a receptacle, into which the carrier part can be inserted.

10. The arrangement according to claim 9, wherein at least one portion of the mating part is designed as an integral component of the carrying device.

11. The arrangement according to claim 9, wherein the mating part comprises arms, which can be spread apart for encompassing the carrier part.

12. The arrangement according to claim 9, wherein the carrier part can be inserted into the receptacle via displacement in an insertion direction and can be removed therefrom, wherein the mating part comprises stops for holding the carrier part transversely to the insertion direction.

13. The arrangement according to claim 9, wherein the mating part includes a fastening part, which can be mounted on or is mounted on the carrying device, and an adapter part, which has the receptacle and is detachably connectable to the fastening part.

14. The arrangement according to claim 13, wherein the adapter part is detachably connectable to the fastening part by means of a bayonet connection.

15. The arrangement according to claim 1, wherein the carrier part comprises protruding arms for forming a bayonet connection with a mating part, which can be mounted on or is mounted on the carrying device.

16. The arrangement according to claim 15, wherein the arms are mounted on the casing of the carrier part, which casing, as seen in a top view, has a substantially circular form.

17. The arrangement according to claim 1, wherein at least one of the carrier part and the fastening aids is produced from metal-free material.

18. An arrangement including a pair of eyeglasses as a carrying device to be carried on a head of a user and a dosimeter device, the dosimeter device comprising:
   a carrier part, which includes a closed casing formed of fixedly interconnected walls, which enclose a measuring element for detecting ionizing radiation different from sunlight, and
   fastening aids for a detachable fastening of the carrier part to said carrying device,
   wherein the fastening aids are configured for defining a location of a fastening of the carrier part on the carrying device, and are also configured so that the measuring element is positioned in a predetermined position on the inside of the pair of eyeglasses in the vicinity of an eye on the lateral shield,
   wherein the fastening aids are further configured to provide a mechanical connection to the carrying device, and excluding fastening aids that fasten by only frictional forces or that include a strap member,
   wherein the fixedly interconnected walls, which enclose the measuring element, are made as one-piece or are integrally bonded to each other to be water-tight, and configured such that, when evaluating the ionizing radiation detected by the measuring element, the carrier part is removed from the pair of eyeglasses and the walls are destroyed to remove the measuring element, and wherein the measuring element is configured to prohibit a direct evaluation of the ionizing radiation detected when fastened to the pair of eyeglasses.

\* \* \* \* \*